(12) United States Patent
Wang et al.

(10) Patent No.: US 10,067,614 B2
(45) Date of Patent: Sep. 4, 2018

(54) IN-CELL TOUCH PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Chunlei Wang, Beijing (CN); Hailin Xue, Beijing (CN); Haisheng Wang, Beijing (CN); Yingming Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 66 days.

(21) Appl. No.: 14/443,594

(22) PCT Filed: Sep. 20, 2014

(86) PCT No.: PCT/CN2014/087005
§ 371 (c)(1),
(2) Date: May 18, 2015

(87) PCT Pub. No.: WO2015/180314
PCT Pub. Date: Dec. 3, 2015

(65) Prior Publication Data
US 2016/0048233 A1 Feb. 18, 2016

(30) Foreign Application Priority Data
May 30, 2014 (CN) .......................... 2014 1 0239900

(51) Int. Cl.
G06F 3/045 (2006.01)
G06F 3/044 (2006.01)
G06F 3/041 (2006.01)

(52) U.S. Cl.
CPC ............ *G06F 3/044* (2013.01); *G06F 3/0412* (2013.01); *G06F 2203/04112* (2013.01)

(58) Field of Classification Search
USPC ........................................ 345/173, 174, 156
See application file for complete search history.

(56) References Cited

U.S. PATENT DOCUMENTS 7,859,521 B2 12/2010 Hotelling et al.
8,901,944 B2 12/2014 Chai et al.
(Continued)

FOREIGN PATENT DOCUMENTS

CN 102314248 A 1/2012
CN 102841718 A 12/2012
(Continued)

OTHER PUBLICATIONS

First Chinese Office Action dated May 30, 2016; Appln. No. 201410239900.1.
(Continued)

*Primary Examiner* — Thuy Pardo
(74) *Attorney, Agent, or Firm* — Ladas & Parry LLP (57) ABSTRACT

An in-cell touch panel and a display device are disclosed. A plurality of mutually independent self-capacitance electrodes arranged in the same layer are disposed in the touch panel in accordance with the self-capacitance principle. A touch detection chip can determine the touch position by the detection of the capacitance variation of the self-capacitance electrode. Compared with the case that body capacitance only acts on the projected capacitance in mutual capacitance, the in-cell touch panel can effectively improve the signal- (Continued)

to-noise ratio of touch and hence can improve the accuracy of touch sensing.

15 Claims, 7 Drawing Sheets

(56) References Cited

U.S. PATENT DOCUMENTS

| | | | |
|---|---|---|---|
| 8,970,537 B1 | 3/2015 | Shepelev et al. | |
| 2010/0194697 A1 | 8/2010 | Hotelling et al. | |
| 2010/0194699 A1 | 8/2010 | Chang | |
| 2010/0214247 A1 | 8/2010 | Tang et al. | |
| 2010/0214260 A1 | 8/2010 | Tanaka et al. | |
| 2011/0096025 A1* | 4/2011 | Slobodin | G06F 3/044 345/174 |
| 2012/0044171 A1* | 2/2012 | Lee | G06F 3/044 345/173 |
| 2012/0218199 A1* | 8/2012 | Kim | G06F 3/0412 345/173 |
| 2013/0257794 A1 | 10/2013 | Lee et al. | |
| 2014/0028616 A1* | 1/2014 | Furutani | G06F 3/044 345/174 |
| 2014/0055412 A1* | 2/2014 | Teramoto | G06F 3/0412 345/174 |
| 2014/0104510 A1 | 4/2014 | Wang et al. | |
| 2014/0111473 A1 | 4/2014 | Yang et al. | |
| 2014/0125626 A1 | 5/2014 | Yang et al. | |
| 2014/0132560 A1 | 5/2014 | Huang et al. | |
| 2014/0146013 A1* | 5/2014 | Noguchi | G02F 1/13338 345/174 |
| 2014/0160066 A1 | 6/2014 | Kim et al. | |
| 2014/0176465 A1 | 6/2014 | Ma et al. | |
| 2014/0313158 A1* | 10/2014 | Mo | G06F 3/044 345/174 |
| 2014/0320767 A1 | 10/2014 | Xu et al. | |
| 2014/0327654 A1* | 11/2014 | Sugita | G06F 3/044 345/174 |
| 2014/0362031 A1 | 12/2014 | Mo et al. | |
| 2015/0035791 A1* | 2/2015 | Mo | G09G 3/3648 345/174 |
| 2015/0091847 A1* | 4/2015 | Chang | G06F 3/044 345/174 |
| 2015/0277655 A1 | 10/2015 | Kim | |
| 2015/0293639 A1* | 10/2015 | Furutani | G06F 3/044 345/174 |
| 2016/0004361 A1* | 1/2016 | Maharyta | G06F 3/044 345/174 |
| 2016/0018922 A1 | 1/2016 | Wang et al. | |
| 2016/0026330 A1* | 1/2016 | Shepelev | G06F 3/044 345/174 |
| 2016/0048233 A1 | 2/2016 | Wang et al. | |
| 2016/0170534 A1* | 6/2016 | Chang | G06F 3/0416 345/174 |
| 2016/0188071 A1 | 6/2016 | Xu et al. | |
| 2016/0195962 A1* | 7/2016 | Miyazaki | G06F 3/0412 345/174 |
| 2016/0283032 A1 | 9/2016 | Kim et al. | |
| 2016/0306454 A1 | 10/2016 | Wang et al. | |
| 2016/0334934 A1 | 11/2016 | Mo et al. | |

FOREIGN PATENT DOCUMENTS

| | | |
|---|---|---|
| CN | 102955635 A | 3/2013 |
| CN | 202854779 U | 4/2013 |
| CN | 202887154 U | 4/2013 |
| CN | 202976049 U | 6/2013 |
| CN | 103186307 A | 7/2013 |
| CN | 103257769 A | 8/2013 |
| CN | 103279245 A | 9/2013 |
| CN | 103293785 A | 9/2013 |
| CN | 103383612 A | 11/2013 |
| CN | 103472613 A | 12/2013 |
| CN | 103472961 A | 12/2013 |
| CN | 203376696 U | 1/2014 |
| CN | 103677454 A | 3/2014 |
| CN | 103698927 A | 4/2014 |
| CN | 103793120 A | 5/2014 |
| CN | 203606816 U | 5/2014 |
| CN | 10402907 A | 9/2014 |
| CN | 104020891 A | 9/2014 |
| CN | 104020893 A | 9/2014 |
| CN | 104020906 A | 9/2014 |
| CN | 104020909 A | 9/2014 |
| CN | 104020910 A | 9/2014 |
| CN | 104020912 A | 9/2014 |
| CN | 104035640 A | 9/2014 |
| EP | 2492784 A2 | 8/2012 |
| EP | 2720124 A2 | 4/2014 |
| EP | 3101516 A1 | 12/2016 |
| KR | 1020120097765 A | 9/2012 |
| KR | 101318448 | 10/2013 |
| TW | 201117082 A | 5/2011 |
| TW | 201413558 A | 4/2014 |

OTHER PUBLICATIONS

International Search Report Appln. No. PCT/CN2014/087005; dated Mar. 2, 2015.
Written Opinion of the International Searching Authority Appln. No. PCT/CN2014/087005; dated Mar. 2, 2015.
USPTO NFOA dated Dec. 16, 2016 in connection with U.S. Appl. No. 14/647,907.
International Search Report and Written Opinion dated Feb. 26, 2015; PCT/CN2014/087007.
International Search Report and Written Opinion dated Feb. 26, 2015; PCT/CN2014/086813.
First Chinese Office Action dated Jun. 23, 2016: Appln. No. 201410239897.3.
First Chinese Office Action dated Jul. 4, 2016; Appln. No. 201410241132.3.
USPTO NFOA dated Jul. 28, 2016 in connection with U.S. Appl. No. 14/443,286.
USPTO NFOA dated Jul. 28, 2016 in connection with U.S. Appl. No. 14/647,907.
Second Chinese Office Action dated Nov. 18, 2016; Appln. No. 201410241132.3.
Extended European Search Report dated Dec. 6, 2017; Appln. No. 14861116.3.
Extended European Search Report dated Dec. 8, 2017; Appln. No. 14863067.6.
Extended European Search Report dated Jan. 3, 2018; Appln. No. 14861120.5.
The Second Chinese Office Action dated Dec. 16, 2016: Appln. No. 201410239897.3.
The Third Chinese Office Action dated Jun. 5, 2017; Appln. No. 201410239897.3.
The Third Chinese Office Action dated Apr. 19, 2017; Appln. No. 20141021132.3.
USPTO FOA dated Dec. 20, 2016 in connection with U.S. Appl. No. 14/443,286.

\* cited by examiner

IN-CELL TOUCH PANEL AND DISPLAY DEVICE

TECHNICAL FIELD

Embodiments of the present invention relate to an in-cell touch panel and a display device.

BACKGROUND

With the rapid development of display technology, touch screen panels have been gradually widespread in people's lives. Currently, in view of the structures, the touch screen panels can be divided into: add-on mode touch panels, on-cell touch panels and in-cell touch panels. The add-on mode touch panel needs to separately produce a touch screen and a liquid crystal display (LCD) which are hence bonded together to form an LCD with touch function. The add-on mode touch panel has the defects of high manufacturing cost, low light transmittance and thick modules. The in-cell touch panel allows touch electrodes of a touch screen to be embedded into an LCD, not only can reduce the overall thickness of modules but also can greatly reduce the manufacturing cost of the touch panel, and is favored by the major panel manufacturers.

SUMMARY

At least one embodiment of the present invention provides an in-cell touch panel and a display device which are used for obtaining the in-cell touch panel with high touch accuracy, low cost, high productivity and high transmittance.

At least one embodiment of the present invention provides an in-cell touch panel, which comprises: a first substrate and a second substrate arranged opposite to each other, a common electrode layer disposed on one side of the first substrate facing the second substrate, and a touch detection chip, wherein the common electrode layer includes a plurality of mutually independent self-capacitance electrodes and a plurality of leads configured to connect the self-capacitance electrodes to the touch detection chip; and the touch detection chip is configured to apply common electrode signals to the self-capacitance electrodes in a display period and determine the touch position by the detection of the capacitance variation of the self-capacitance electrode in a touch period.

At least one embodiment of the present invention provides a display device, which comprises the foregoing in-cell touch panel.

BRIEF DESCRIPTION OF THE DRAWINGS

Simple description will be given below to the accompanying drawings of the embodiments to provide a more clear understanding of the technical proposals of the embodiments of the present invention. Obviously, the drawings described below only involve some embodiments of the present invention but are not intended to limit the present invention.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. Obviously, the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Thickness and the shape of layers in the accompanying drawings do not reflect the true scale and are only intended to illustrate the content of the present invention.

Figure 1:
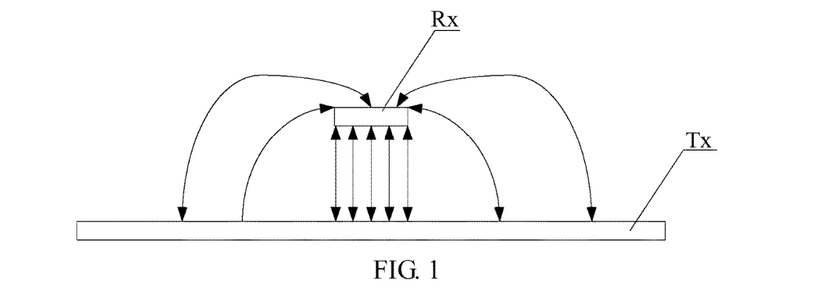
FIG. 1 is a schematic diagram illustrating the capacitance between a touch drive electrode and a touch sensing electrode.

The capacitive in-cell touch panel is to additionally arrange touch drive electrodes and touch sensing electrodes on a thin-film transistor (TFT) array substrate, namely two layers of indium tin oxide (ITO) strip electrodes which intersect each other in different layers are manufactured on a surface of the TFT array substrate and used as the touch drive electrodes and the touch sensing electrodes respectively. As illustrated in FIG. 1, mutual capacitance $C_m$ is produced between the transversely arranged touch drive electrode Tx and the longitudinally arranged touch sensing electrode Rx through coupling therebetween. When a finger touches a screen, the value of the mutual capacitance $C_m$ will be changed by finger touch. A touch detection device determines the position of a finger touch point by the detection of the variation of current corresponding to the capacitance $C_m$ before and after finger touch.

As illustrated in FIG. 1, two kinds of mutual capacitance $C_m$ will be formed between the transversely arranged touch drive electrode Tx and the longitudinally arranged touch sensing electrode Rx. One kind is projected capacitance (curves with arrows in FIG. 1 refer to projected capacitance) which is effective to achieve the touch function. When the finger touches the screen, the value of the projected capacitance will be changed by the operation. The other kind is direct capacitance (straight lines with arrows refer to direct capacitance) which is ineffective to achieve the touch function. When the finger touches the screen, the value of the direct capacitance will not be changed.

In the structure of the capacitive in-cell touch panel, human body capacitance is only coupled with the projected capacitance in the mutual capacitance; and the direct capacitance formed by the touch drive electrode and the touch sensing electrode at the right opposite portion will reduce the signal-to-noise ratio of the touch panel and hence affect the accuracy of touch sensing in the in-cell touch panel. Moreover, the capacitive in-cell touch panel additionally needs two new layers based on a traditional TFT array substrate, so that new processes must be added in the process of manufacturing the TFT array substrate. Therefore, the manufacturing cost can be increased and the productivity cannot be improved.

The in-cell touch panel provided by at least one embodiment of the present invention is more applicable to a twisted nematic (TN) LCD.

Figure 2:
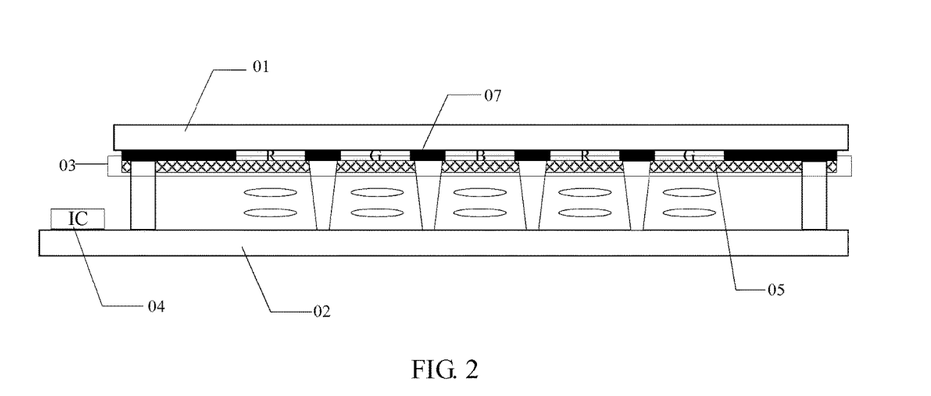
FIG. 2 is a schematic structural view of an in-cell touch panel provided by an embodiment of the present invention.

An embodiment of the present invention provides an in-cell touch panel which, as illustrated in FIG. 2, comprises: a first substrate 01 and a second substrate 02 arranged opposite to each other, a common electrode layer 03 disposed on one side of the first substrate 01, which side faces the second substrate 02, and a touch detection chip 04.

Figure 3:
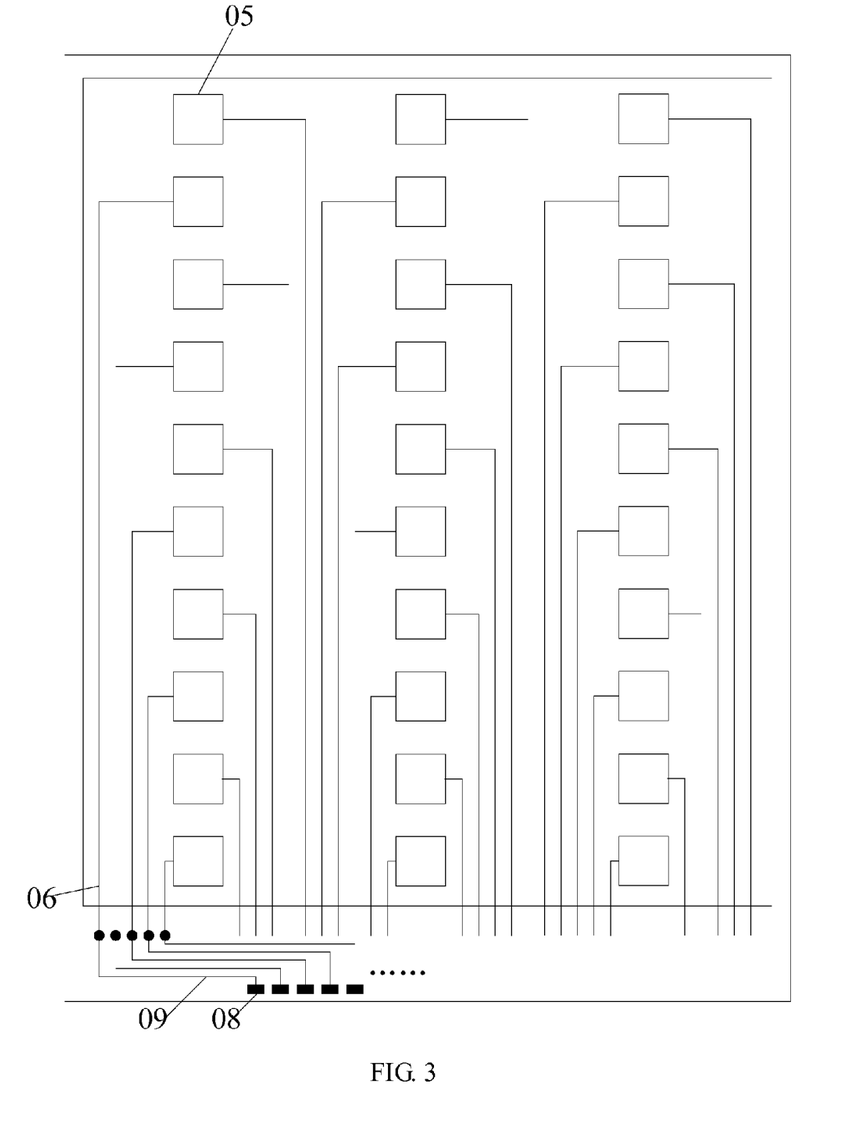
FIG. 3 is a schematic top view 1 of the in-cell touch panel provided by an embodiment of the present invention.

As illustrated in FIG. 3, the common electrode layer 03 is divided into a plurality of self-capacitance electrodes 05 that are mutually independent and a plurality of leads 06 configured to connect the self-capacitance electrodes 05 to the touch detection chip 04. That is to say, the common electrode layer 03 includes the plurality of self-capacitance electrodes 05 that are mutually independent.

The touch detection chip (IC) 04 is configured to apply common electrode signals to the self-capacitance electrodes 05 in a display period and determine the touch position by the detection of the capacitance variation of the self-capacitance electrode 05 in a touch period. As illustrated in FIG. 2, the touch detection chip 04 is disposed on the second substrate. But the present invention is not limited thereto. The touch detection chip 04 may also be disposed on the first substrate 01 or connected to the second substrate 02 through a flexible circuit board, etc.

In the in-cell touch panel provided by at least one embodiment of the present invention, the plurality of self-capacitance electrodes 05 that are mutually independent arranged in the same layer are disposed on the first substrate 01 of the touch panel in accordance with the self-capacitance principle. When a human body does not touch the screen, the capacitance of the self-capacitance electrode 05 is at a fixed value. When a human body touches the screen, the capacitance of corresponding self-capacitance electrode 05 is at a value of the fixed value plus the body capacitance. The touch detection chip 04 can determine the touch position by the detection of the capacitance variation of the self-capacitance electrode in the touch period. As the body capacitance may act on the entire self-capacitance, compared with the case that the body capacitance can only act on the projected capacitance in the mutual capacitance, the touch variation caused by the touch of the human body on the screen will become larger. Therefore, the signal-to-noise ratio of touch can be effectively improved, and hence the accuracy of touch sensing can be improved.

In order to effectively detect the capacitance variation of the self-capacitance electrode 05, the touch detection chip 04 may apply drive signals to the self-capacitance electrodes 05 in the touch period and receive feedback signals of the self-capacitance electrodes 05. The capacitance variation caused by the touch of the self-capacitance electrodes 05 will increase the RC relay of the feedback signals. Therefore, whether the self-capacitance electrode 05 is touched can be determined by the determination of the RC relay of the feedback signal of the self-capacitance electrode 05, and hence the touch position can be positioned. Of course, the touch detection chip 04 may also determine the touch position by the determination of the capacitance variation of the self-capacitance electrode 05 by detecting the charge variation, etc. No further description will be given here.

Moreover, in the touch panel provided by an embodiment of the present invention, the common electrode layer 03 is multiplexed/reused as the self-capacitance electrodes 05; and a pattern of the common electrode layer 03 in a TN mode display is modified to form a plurality of self-capacitance electrodes 05 that are mutually independent and leads 06 configured to connect the self-capacitance electrodes 05 to the touch detection chip 04. Compared with the case that two new layers must be added in the array substrate when the touch function is achieved in accordance with the mutual-capacitance principle, in the touch panel provided by an embodiment of the present invention, no additional layer must be added and only the original common electrode layer 03 arranged in the entire layer must be patterned to form patterns of corresponding self-capacitance electrodes 05 and leads 06. Therefore, the manufacturing cost can be reduced and the productivity can be improved.

As the common electrode layer 03 is multiplexed as the self-capacitance electrodes 05 in the touch panel provided by an embodiment of the present invention, the time-sharing drive mode in the touch period and the display period may be adopted. In one preferred embodiment, a display drive chip and a touch detection chip may also be integrated into one chip, so that the manufacturing cost can be further reduced.

Figure 4A:
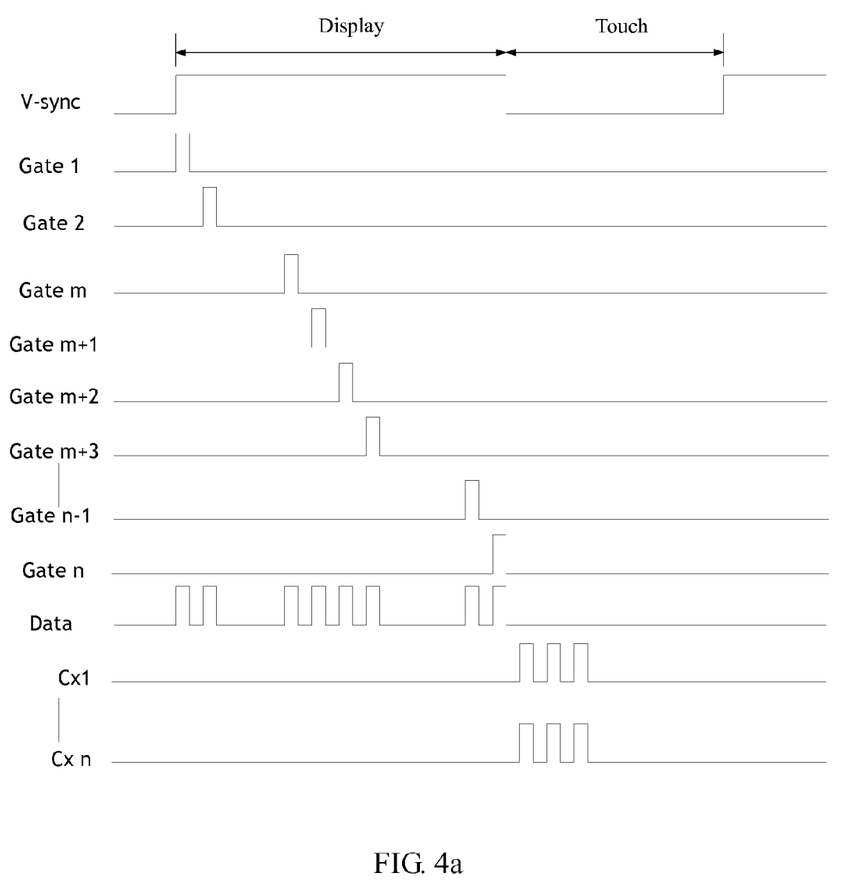
FIGS. 4a and 4b are respectively a drive timing sequence diagram of an in-cell touch panel provided by the embodiment of the present invention.
Figure 4B:
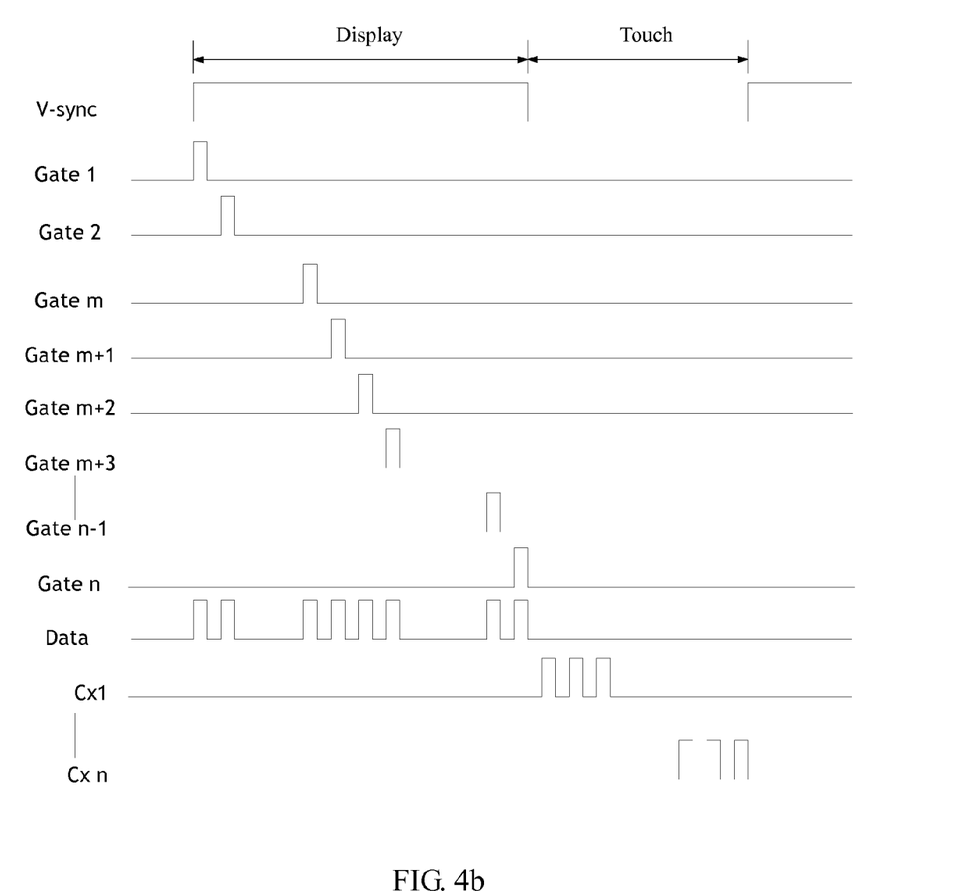

For instance, in the drive timing sequence diagram as shown in FIGS. 4a and 4b, the time of the touch panel for displaying each frame (V-sync) is divided into display period (Display) and touch period (Touch). Moreover, in the drive timing sequence diagram, the time of the touch panel for displaying one frame is 16.7 ms, in which 5 ms is selected as the touch period and the remaining 11.7 ms is taken as the display period. Of course, the duration of the touch period and the display period may also be appropriately adjusted according to the processing capability of the IC. No specific limitation will be given here. In the display period (Display), a gate scanning signal is applied to each gate signal line Gate 1, Gate 2 . . . Gate n in the touch panel in sequence, and gray-scale signals are applied to data signal lines Data; and the touch detection chip connected with the self-capacitance electrodes Cx 1 . . . Cx n is configured to apply common electrode signals to the self-capacitance electrodes Cx 1 . . . Cx n respectively to achieve the function of liquid crystal display. In the touch panel (Touch), as illustrated in FIG. 4a, the touch detection chip connected with the self-capacitance electrodes Cx 1 . . . Cx n is configured to apply drive signals to the self-capacitance electrodes Cx 1 . . . Cx n simultaneously and receive feedback signals of the self-capacitance electrodes Cx 1 . . . Cx n simultaneously; or as illustrated in FIG. 4b, the touch detection chip connected with the self-capacitance electrodes Cx 1 . . . Cx n is configured to apply drive signals to the self-capacitance electrodes Cx 1 . . . Cx n sequentially and receive feedback signals of the self-capacitance electrodes Cx 1 . . . Cx n respectively. No limitation will be given here. Whether touch occurs is determined by the analysis of the feedback signals, so that the touch function can be achieved.

In general, the resolution of the touch panel is usually in millimeter level. Therefore, the density and the occupied area of the self-capacitance electrode 05 may be selected according to the required touch resolution so as to ensure the required touch resolution. Generally, the self-capacitance electrode 05 is designed to be a square electrode with the size of about 5 mm*5 mm. The resolution of a display is usually in micron level. Therefore, generally, one self-capacitance electrode 05 will correspond to a plurality of pixel units in the display.

Moreover, in the in-cell touch panel provided by at least one embodiment of the present invention, the common electrode layer 03, the whole layer of which is disposed on the first substrate 01, may be divided into the plurality of self-capacitance electrodes 05 and corresponding leads 06. In order to not affect the normal display function, in the process of dividing the common electrode layer 03, dividing lines will usually be kept away from the opening areas for display and are disposed at an area provided with a pattern of a black matrix (BM) layer.

As illustrated in FIG. 2, the touch panel provided by at least one embodiment of the present invention may further comprise: a BM layer 07 disposed on one side of the first substrate 01 facing the second substrate 02 or one side of the second substrate 02 facing the first substrate 01.

An orthographic projection of a dividing gap between two adjacent self-capacitance electrodes 05 on the second substrate 02 is disposed in an area provided with a pattern of the BM layer 07.

For instance, orthographic projections of patterns of the leads 06 on the second substrate 02 are all disposed in the area provided with the pattern of the BM layer 07.

When the touch panel is designed in accordance with the self-capacitance principle, as illustrated in FIG. 3, for instance, generally, each self-capacitance electrode 05 may be connected with the touch detection chip 04 through an independent leading-out wire. Each leading-out wire, for instance, includes: a lead 06 configured to connect the self-capacitance electrode 05 to a bezel of the touch panel and a peripheral wiring 09 disposed on the bezel and configured to connect the self-capacitance electrode 05 to a connecting terminal 08 of the touch detection chip. That is to say, the peripheral wiring 09 is electrically connected with the connecting terminal 08 of the touch detection chip 04. For instance, the peripheral wirings 09 and the connecting terminals 08 of the touch detection chip 04 are generally disposed on the bezel on one side of the second substrate 02 facing the first substrate 01. In that way, the self-capacitance electrode 05 must be electrically connected with corresponding peripheral wiring 09 through sealant after being connected to the bezel of the in-cell touch panel through the lead 06 at first.

In one specific embodiment, because the number of the self-capacitance electrodes 05 is very large, corresponding leading-out wires will be also very large. Taking the case that the occupied area of each self-capacitance electrode 05 is 5 mm*5 mm, a 5-inch LCD requires 264 self-capacitance electrodes 05. If each self-capacitance electrode 05 is designed to be smaller, more self-capacitance electrodes 05 will be required, and hence more leading-out wires must be provided. Because both the leads 06 in the leading-out wires and the self-capacitance electrodes 05 are disposed in the common electrode layer 03 and the pattern of the BM layer 07 must cover all the leads 06 in order to not disadvantageously affect normal display, the pattern of the BM layer 07 covering the leads 06 will be larger, and hence the aperture ratio of pixel units can be affected. In addition, as the number of the leads is larger, the number of the peripheral wirings 09 disposed on the bezel and connected with the leads 06 in one-to-one correspondence will also be larger. Therefore, the bezel of the touch panel will become wider, which is not favorable for a narrow-bezel design.

Figure 5:
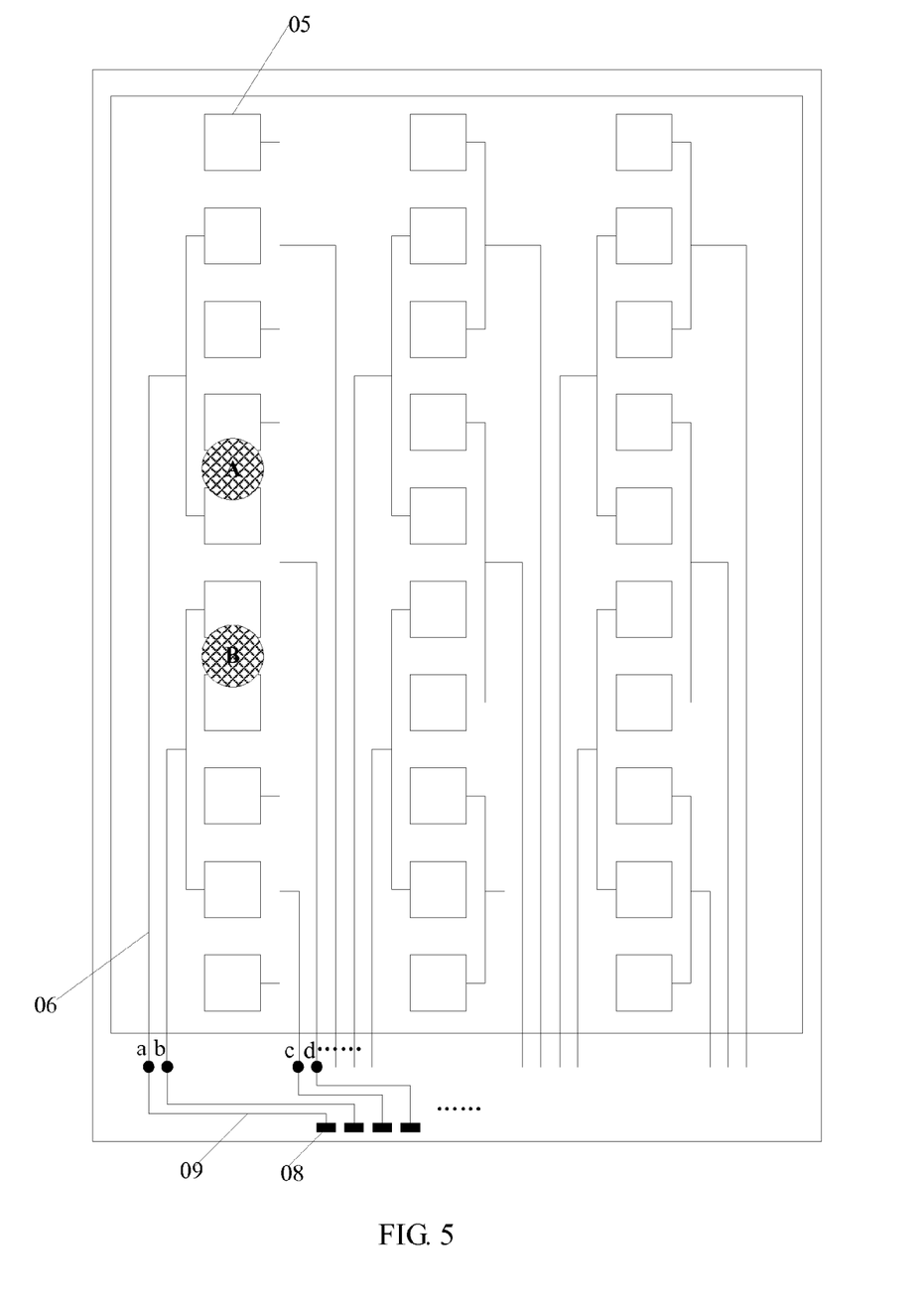
FIG. 5 is a schematic top view 2 of the in-cell touch panel provided by an embodiment of the present invention.

In order to solve the above problem, in the touch panel provided by at least one embodiment of the present invention, as illustrated in FIG. 5, each lead 06 is electrically connected with two mutually separated (two every other) self-capacitance electrodes 05, and the self-capacitance electrodes 05 electrically connected with different leads 06 are not overlapped with each other. Two spaced self-capacitance electrodes 05 are connected to the touch detection chip 04 for touch position detection through one corresponding peripheral wiring 09 after being connected to the bezel of the touch panel through one lead 06. In this way, compared with the connection means as show in FIG. 3 in which the self-capacitance electrodes 05 and the leads 06 are connected with each other in one-to-one correspondence, the number of the leads 06 will be reduced by half. In addition, along with the reduced number of the leads 06, the number of the peripheral wirings 09 corresponding to the leads 06 is also reduced, which is also favorable to the narrow-bezel design of the touch panel.

Moreover, as the two mutually separated self-capacitance electrodes 05 are connected with each other through one lead 06, and adjacent self-capacitance electrodes 05 are connected to the bezel through different leads 06, and therefore, when a human body touches a screen, the touch detection chip 04 can determine the touch position by determination of capacitance variation of adjacent self-capacitance electrodes 05 connected with different leads 06, so that misjudgment can be avoided and the accuracy of touch sensing can be achieved. Taking the connection relationship of the self-capacitance electrodes 05 as shown in FIG. 5 as an example, as the self-capacitance electrodes 05 in the x direction are not connected with each other through the same lead 06, the position in the x direction may be accurately determined; and as the self-capacitance electrodes 05 in the y direction are pair-wise connected, the position in the y direction must be determined by the signal variation on different leads 06. For instance, when the finger touches a position A, both the positions A and B may be touched according to the signal variation on a lead "d". But because the signal on a lead "a" is changed and the signal on a lead "b" is not changed, only the A position is touched.

Figure 6:
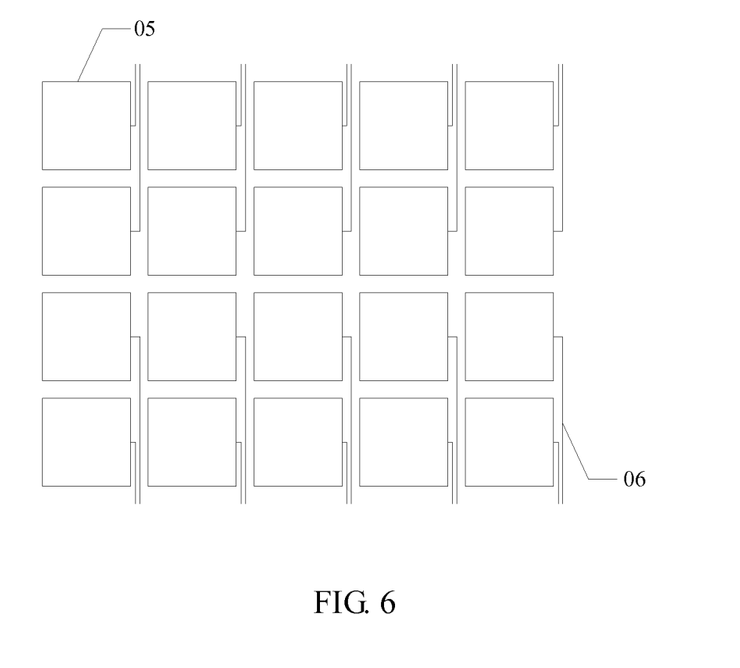
FIG. 6 is a schematic top view 3 of the in-cell touch panel provided by an embodiment of the present invention.

No matter the leads 06 and the self-capacitance electrodes 05 are connected with each other in one-to-one correspondence or the lead 06 is connected with two self-capacitance electrodes 05 correspondingly, when the extension direction of the leads 06 is designed, the extension direction of the leads 06 may be set to be same as each other. Generally, the bezel of the touch panel is rectangular. Moreover, in order to optimize the occupied area of the leads, the extension direction of the leads 06 may be set to be consistent with the short-side direction of the bezel, namely as shown in FIG. 6. The self-capacitance electrode 05 is connected to a long side of the bezel through the lead 06 along the short-side direction of the bezel. In this way, the occupied area of the leads 06 may be reduced by reducing the number of the leads 06 at gaps between two adjacent columns of self-capacitance electrodes 05, so that the area of the pattern of the BM layer 07 covering the leads 06 can be reduced, and hence the aperture ratio of pixel units can be improved.

In order to ensure that the pixel units have a larger aperture ratio, the bezel of the touch panel generally has four sides, and the self-capacitance electrodes 05 may be connected to a nearest side through corresponding leads 06 if the leads 06 do not intersect with each other. In this way, the number of the leads 06 between the self-capacitance electrodes 05 may be reduced as much as possible, so that the area of the pattern of the BM layer 07 can be reduced as a whole, and hence a large aperture ratio of the pixel units can be guaranteed.

Moreover, in the in-cell touch panel provided by at least one embodiment of the present invention, as body capacitance acts on the self-capacitance of the self-capacitance electrode 05 through direct coupling, when a human body touches the screen, only the capacitance of the self-capacitance electrodes 05 below the touch position experiences large variation and the capacitance of the self-capacitance electrodes 05 adjacent to the self-capacitance electrodes 05 below the touch position experiences very small variation. In this way, in the process of sliding on the touch panel, the touch coordinate in an area provided with the self-capacitance electrodes 05 cannot be determined. In order to solve the problem, in the in-cell touch panel provided by another embodiment of the present invention, both opposite sides of two adjacent self-capacitance electrodes 05 may be set to be bend lines (zigzag lines) to increase the capacitance variation of the self-capacitance electrodes 05 adjacent to the self-capacitance electrodes 05 below the touch position.

Figure 7A:
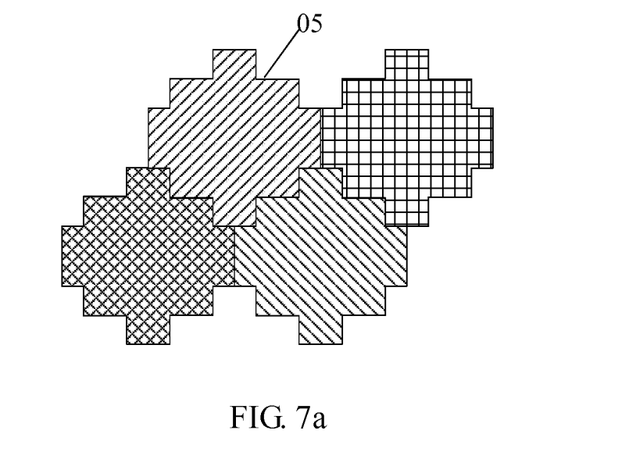
FIGS. 7a and 7b are respectively a schematic structural view of the in-cell touch panel provided by an embodiment of the present invention in which opposite sides of adjacent self-capacitance electrodes are set to be bend lines.
Figure 7B:
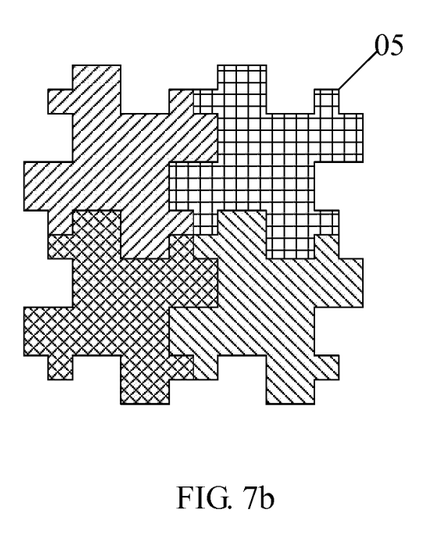

For instance, the overall shape of the self-capacitance electrodes 05 may be set by one or a combination of the following two ways:

1. Both the opposite sides of the two adjacent self-capacitance electrodes 05, being bend lines, may be set to have stepped structures, and the two stepped structures have consistent shape match with each other, as shown in FIG. 7a which illustrates 2*2 self-capacitance electrodes 05.
2. Both the opposite sides of the two adjacent self-capacitance electrodes 05, being bend lines, may be set to have concave-convex structures, and the two concave-convex structures have consistent shape match with each other, as shown in FIG. 7b which illustrates 2*self-capacitance electrodes 05.

At least one embodiment of the present invention further provides a display device, which comprises the in-cell touch panel provided by an embodiment of the present invention. The display device may be: any product or component with display function such as a mobile phone, a tablet PC, a TV, a display, a notebook computer, a digital picture frame and a navigator. The embodiments of the display device may refer to the embodiments of the in-cell touch panel. No further description will be given here.

In the in-cell touch panel and the display device, provided by at least one embodiment of the present invention, a plurality of self-capacitance electrodes mutually independently arranged in the same layer are disposed on the first substrate of the touch panel in accordance with the self-capacitance principle. When a human body does not touch the screen, the capacitance of the self-capacitance electrode is at a fixed value. When a human body touches the screen, the capacitance of corresponding self-capacitance electrode is at a value of the fixed value plus the body capacitance. The touch detection chip can determine the touch position by the detection of the capacitance variation of the self-capacitance electrode in a touch period. As the body capacitance may act on the entire self-capacitance, compared with the case that the body capacitance can only act on the projected capacitance in the mutual capacitance, the touch variation caused by the fact that the human body touches the screen will be relatively large. Therefore, the signal-to-noise ratio of touch can be effectively improved, and hence the accuracy of touch sensing can be improved.

Moreover, compared with the case that two extra layers must be added in the array substrate when the touch function is achieved in accordance with the mutual-capacitance principle, in the touch panel provided by at least one embodiment of the present invention, the pattern of the TN mode common electrode layer may be modified to form the plurality of mutually independent self-capacitance electrodes and the leads configured to connect the self-capacitance electrodes to the touch detection chip, so that no additional layer must be added. Therefore, the manufacturing cost can be reduced and the productivity can be improved.

The foregoing is only the preferred embodiments of the present invention and not intended to limit the scope of protection of the present invention. The scope of protection of the present invention should be defined by the appended claims.

The application claims priority to the Chinese patent application No. 201410239900.1, filed May 30, 2014, the disclosure of which is incorporated herein by reference as part of the application.

The invention claimed is:

1. An in-cell touch panel, comprising: a first substrate and a second substrate arranged opposite to each other, a common electrode layer disposed on one side of the first substrate facing the second substrate, and a touch detection chip, wherein
   the common electrode layer includes a plurality of mutually independent self-capacitance electrodes, which are disposed in a same layer and arranged in matrix having rows and columns, and a plurality of leads configured to connect the self-capacitance electrodes to the touch detection chip; and
   the touch detection chip is configured to apply common electrode signals to the self-capacitance electrodes in a display period and determine the touch position by applying driving signals to the self-capacitance electrodes and detecting the self-capacitance variation of the self-capacitance electrode in a touch period;
   each lead is electrically connected with two mutually separated self-capacitance electrodes, and the self-capacitance electrodes electrically connected with different leads do not overlapped with each other.

2. The in-cell touch panel according to claim 1, further comprising: a black matrix (BM) layer disposed on one side of the first substrate facing the second substrate or one side of the second substrate facing the first substrate, wherein
   an orthographic projection of a dividing gap between two adjacent self-capacitance electrodes on the second substrate is disposed in an area provided with a pattern of the BM layer; and
   orthographic projections of patterns of the leads on the second substrate are all disposed in the area provided with the pattern of the BM layer.

3. The in-cell touch panel according to claim 2, further comprising: peripheral wirings electrically connected with connecting terminals of the touch detection chip,
   wherein the peripheral wirings and the connecting terminals of the touch detection chip are disposed on a bezel on one side of the second substrate facing the first substrate; and
   the self-capacitance electrodes are electrically connected with corresponding peripheral wirings through sealant after being connected to the bezel of the in-cell touch panel through the leads.

4. The in-cell touch panel according to claim 3, wherein the bezel of the in-cell touch panel is rectangular; and the self-capacitance electrodes are connected to a long side of the bezel through the leads along a short-side direction of the bezel.

5. The in-cell touch panel according to claim 3, wherein the bezel of the in-cell touch panel has four sides; and the self-capacitance electrodes are connected to a nearest side through corresponding leads where the leads do not intersect with each other.

6. The in-cell touch panel according to claim 2, wherein both opposite sides of two adjacent self-capacitance electrodes are bend lines.

7. The in-cell touch panel according to claim 6, wherein both the opposite sides of the two adjacent self-capacitance electrodes, being bend lines, have stepped structures; and the two stepped structures have consistent shape match with each other.

8. The in-cell touch panel according to claim 6, wherein both the opposite sides of the two adjacent self-capacitance electrodes, being bend lines, have concave-convex structures; and the two concave-convex structures have consistent shape match with each other.

9. The in-cell touch panel according to claim 1, further comprising: peripheral wirings electrically connected with connecting terminals of the touch detection chip,
wherein the peripheral wirings and the connecting terminals of the touch detection chip are disposed on a bezel on one side of the second substrate facing the first substrate; and
the self-capacitance electrodes are electrically connected with corresponding peripheral wirings through sealant after being connected to the bezel of the in-cell touch panel through the leads.

10. The in-cell touch panel according to claim 9, wherein the bezel of the in-cell touch panel is rectangular; and the self-capacitance electrodes are connected to a long side of the bezel through the leads along a short-side direction of the bezel.

11. The in-cell touch panel according to claim 9, wherein the bezel of the in-cell touch panel has four sides; and the self-capacitance electrodes are connected to a nearest side through corresponding leads where the leads do not intersect with each other.

12. The in-cell touch panel according to claim 1, wherein both opposite sides of two adjacent self-capacitance electrodes are bend lines located in a plane parallel to the common electrode layer.

13. The in-cell touch panel according to claim 12, wherein both the opposite sides of the two adjacent self-capacitance electrodes, being bend lines, have stepped structures; and the two stepped structures have consistent shape match with each other.

14. The in-cell touch panel according to claim 12, wherein both the opposite sides of the two adjacent self-capacitance electrodes, being bend lines, have concave-convex structures; and the two concave-convex structures have consistent shape match with each other.

15. A display device, comprising the in-cell touch panel according to claim 1.

* * * * *